A. W. KEEN AND P. FRIGERI.
COMPOSITE SHEET MATERIAL.
APPLICATION FILED JUNE 5, 1917.
1,320,149.
Patented Oct. 28, 1919.
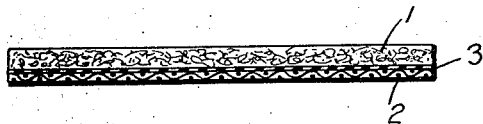
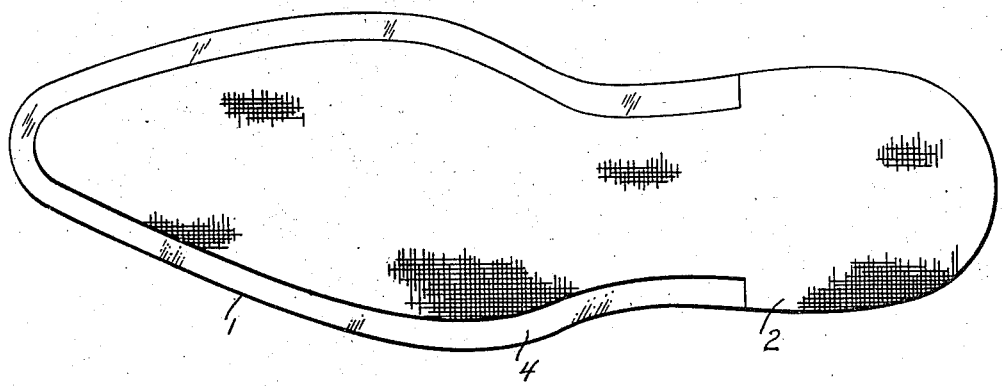
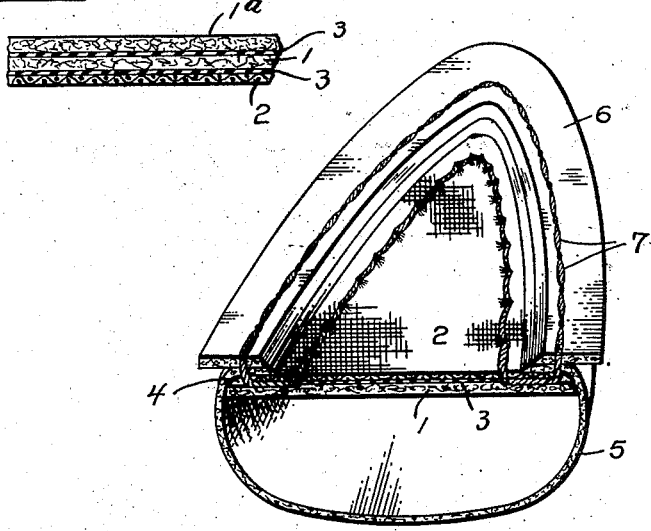
Attest:
Inventors.
Alexis W. Keen and
Pietro Frigeri,
by Ernest Hopkinson their Atty.

UNITED STATES PATENT OFFICE.

ALEXIS W. KEEN AND PIETRO FRIGERI, OF NEW YORK, N. Y., ASSIGNORS TO RUBBER REGENERATING COMPANY, A CORPORATION OF INDIANA.

COMPOSITE SHEET MATERIAL.

1,320,149.     Specification of Letters Patent.    Patented Oct. 28, 1919.

Application filed June 5, 1917. Serial No. 172,861.

*To all whom it may concern:*

Be it known that we, ALEXIS W. KEEN, a citizen of the United States, residing in the city of New York, county of New York, and State of New York, and PIETRO FRIGERI, a subject of the King of Italy, residing in the city of New York, county of Bronx, and State of New York, have invented certain new and useful Improvements in Composite Sheet Material, of which the following is a full, clear, and exact description.

This invention relates to composite sheet material.

The object of this invention is to provide a material having characteristics of, and adapted to be used in place of leather. Our material is particularly adapted for the manufacture of insoles but we do not confine ourselves thereto as it is equally suitable for many other uses to which leather is put.

In shoes of welt construction, it is desirable that the insole be relatively light and flexible yet sufficiently strong to support the welt and upper which are stitched to its lower surface. Heretofore leather has been largely used for this purpose. Even leather, however, has certain characteristics which make it objectionable, one of which is its tendency to become dry and brittle and finally disintegrate after comparatively short service, occasioned by the action of the heat and moisture from the wearer's foot.

By this invention we provide a material which not only has the requisite strength for the above purpose but which also retains its flexibility and strength indefinitely. This we accomplish by providing a laminated structure consisting of a layer or layers of impregnated and compressed fibrous material, preferably felted wool or other similar fibers, to one side of which is attached, preferably by a vulcanized rubber compound; a ply of strong woven fabric.

For a clearer understanding of this invention, reference is made to the following description and to the accompanying drawings in which:—

Figure 1 is a cross-sectional view of a sheet of our material,

Fig. 2 is a similar view of a modified construction,

Fig. 3 is a bottom view of an insole made therefrom, and

Fig. 4 is a view partly in cross section and partly in perspective, showing an insole of our material with a shoe upper and welt attached thereto.

Referring to Fig. 1 of the drawing which illustrates our material in its simplest form, 1 designates the fibrous body of our composite material. This consists preferably of a wool felt impregnated with an oxidized oil. Firmly united to one surface of the felt 1 is a ply of strong woven fabric 2. The bond between the felt and the woven fabric is maintained by an intermediate adhesive layer 3 the substance which we have found most satisfactory for this purpose being vulcanized rubber or rubber compound. The union of the fabric and felt is accomplished by covering one surface of each with the rubber by any preferred means, as for instance passing the sheets through a friction calendering machine, placing the rubber coated surfaces together, and subjecting the built-up structure to pressure. The laminated sheet is then subjected to a vulcanizing heat whereby the rubber is cured.

In Fig. 2 is illustrated a modified construction wherein instead of a single ply of impregnated felt, a double layer is used. For many purposes we have found this structure preferable to that shown in Fig. 1. For instance, it is often desirable that an insole have a smooth slipping surface. This is accomplished by the specially prepared layer of felt 1$^a$ which contains, in addition to the oxidized oil, a mineral or other filler and a pigment. To produce a sort of glaze on the felt, this layer is separately subjected to a very high pressure, for instance 1000 pounds per square inch. This forces some of the oil and filling material above mentioned to the surface, forming a sort of glaze. The central layer of felt 1 and the fabric 2 are then added, as in the first mentioned construction, strata of rubber being interposed as a uniting means. It is then vulcanized as above outlined.

In Fig. 3 of the drawing we have shown the bottom view of an insole adapted for use in a hand made shoe of the welt construction. About that part of the sole to which the welt is attached the fabric is cut away forming a narrow margin 4. The function of the fabric ply 2 may be clearly understood by referring to Fig. 4 which shows the construction of a hand made shoe of the welt type. The shoe upper 5 is drawn over the bottom side of the insole and ordinarily tacked in place thereon. Over this is applied the welt 6 and the two are then permanently fastened in position by means of stitching 7. The stitches 7 do not pass directly through the insole but run laterally under the bottom surface thereof and emerge on the same side on which they enter. It is therefore necessary that the bottom surface of the insole be of sufficient strength to hold the thread which is inserted under considerable tension. The fabric ply 2 supplies the necessary strength to an even higher degree than does the leather of the conventional insole. The upper stratum 1 of the insole imparts the required stiffness to the structure as well as a surface which is unaffected by perspiration or the heat of the wearer's foot. In this respect it presents a marked superiority over the most expensive leather which, as is well known, rapidly decomposes under the circumstances.

The intermediate adhesive layer of elastic composition 3 is easily penetrated by a needle or awl and therefore forms a guide for such instruments so that the thread of the stitches are accurately located between the felt and the fabric, obviating the weakening of either ply of these materials. The holding force of the stitches acts directly upon the fabric and this being in turn united with the felt, the holding force is distributed over large areas of the latter.

When the three ply sheet illustrated in Fig. 2 is used the less compact intermediate felt layer conforms to the stitches so that no irregularities are formed on the inner surface of the sole with resultant discomfort to the wearer.

While we have thus far confined our description to the construction of a hand made shoe of the welt type, our sheet material is clearly suitable for the other well known shoe constructions such, for instance, as the McKay stitched, the Goodyear welt, turned shoes, etc., inasmuch as the above mentioned objectionable characteristics of leather are equally apparent in the latter types.

We are aware that various substitutes for leather have been used for insoles, such for instance as thin plies of compacted leather fiber superposed and united by glue. These substitutes, however, present the above mentioned objections even more markedly than does leather itself. We are also aware that woven fabric has been used as a reinforcement for cheap grades of leather and therefore do not wish to be understood as broadly claiming the use of woven fabric in a shoe insole. In all of the past uses of fabric for this purpose, so far as we are aware, the various elements of the sole have been united by means of ordinary glue. This is quickly softened by the heat and moisture of the wearer's foot with the result that the various parts soon separate.

The fibrous element of our insole as above pointed out presents marked superiority over leather in the following particulars: It does not disentegrate from the action of the moisture of the wearer's feet; it does not curl about the edges as does leather; and it wears away much less rapidly than does leather. The fabric ply 2 of our insole is less liable to be broken or cut by the stitches than is leather and the vulcanized rubber strata supply water-proof, elastic premanent bonds between the fabric and the impregnated felt.

While we have thus far confined ourselves to the mention of uses of our material in shoe insoles we do not wish to be understood as limiting ourselves thereto, as it is equally suitable for nearly all of the purposes for which leather has been employed, as well as many uses for which leather is entirely unsuitable.

What we claim and desire to protect by Letters Patent is:

1. A composite sheet material including a fibrous sheet impregnated with an oxidized oil, textile fabric superposed on one surface thereof, and a layer of elastic adhesive material uniting said fibrous sheet and fabric.

2. A composite sheet material including a fibrous sheet impregnated with an oxidized oil, textile fabric superposed on one surface thereof, and a layer of vulcanized rubber compound uniting said fibrous sheet and fabric.

3. A composite sheet material including a body portion of felt impregnated with an oxidized oil, textile fabric superposed on one surface thereof, and a layer of vulcanized rubber compound uniting said felt and fabric.

4. A substitute for leather consisting of a layer of textile, a layer of felt impregnated with an oxidized oil, a second and exterior layer of compressed felt impregnated with an oxidized oil, and a rubber composition uniting the several layers together and vulcanized thereto.

Signed at New York, N. Y., this 25th day of May 1917.

ALEXIS W. KEEN.

Signed at New York, N. Y., this 29th day of May 1917.

PIETRO FRIGERI.